United States Patent [19]

Howe, Jr. et al.

[11] 3,792,912
[45] Feb. 19, 1974

[54] BEARING WITH COMBINED SLINGER-SEAL

[75] Inventors: Ralph S. Howe, Jr., New Britain; Thorn W. Dickinson, Berlin; Milton G. Sandstrom, Bristol, all of Conn.

[73] Assignee: Textron Inc., Providence, R.I.

[22] Filed: May 10, 1972

[21] Appl. No.: 252,325

[52] U.S. Cl.................. 308/187.2, 277/58, 277/94
[51] Int. Cl............................................. F16c 33/78
[58] Field of Search............ 308/187.1, 187.2, 36.4; 277/94, 95, 58, 25

[56] References Cited
UNITED STATES PATENTS

| | | | |
|---|---|---|---|
| 3,630,530 | 12/1971 | Mackas | 308/187.1 |
| 1,917,988 | 7/1933 | Large | 308/187.2 |
| 2,678,246 | 5/1954 | Potter | 308/187.2 |
| 1,871,033 | 8/1932 | Bott | 308/187.2 |
| 2,702,868 | 2/1955 | Kindig | 277/58 |
| 3,268,984 | 8/1966 | Kupchick | 308/187.2 |
| 3,071,385 | 1/1963 | Greiner | 308/187.2 |
| 2,967,743 | 1/1961 | Howe, Jr. | 308/187.1 |
| 2,856,246 | 10/1958 | Gaubatz | 308/187.1 |
| 1,839,677 | 1/1932 | Hodge | 308/187.2 |
| 2,979,345 | 4/1961 | Potter | 277/58 |

Primary Examiner—Charles J. Myhre
Assistant Examiner—Barry Grossman
Attorney, Agent, or Firm—Sandoe, Hopgood & Calimafde

[57] ABSTRACT

The invention contemplates application to the inner ring of a bearing to seal off an axial end of the space between inner and outer bearing rings and at the same time achieve slinger and other protective functions. Among the protective functions is the provision of means forming part of the seal support and serving to prevent inverted dislocation of the seal even in the presence of a high-pressure fluid discharge, as when hosing down the structure in which the bearing is embodied.

14 Claims, 4 Drawing Figures

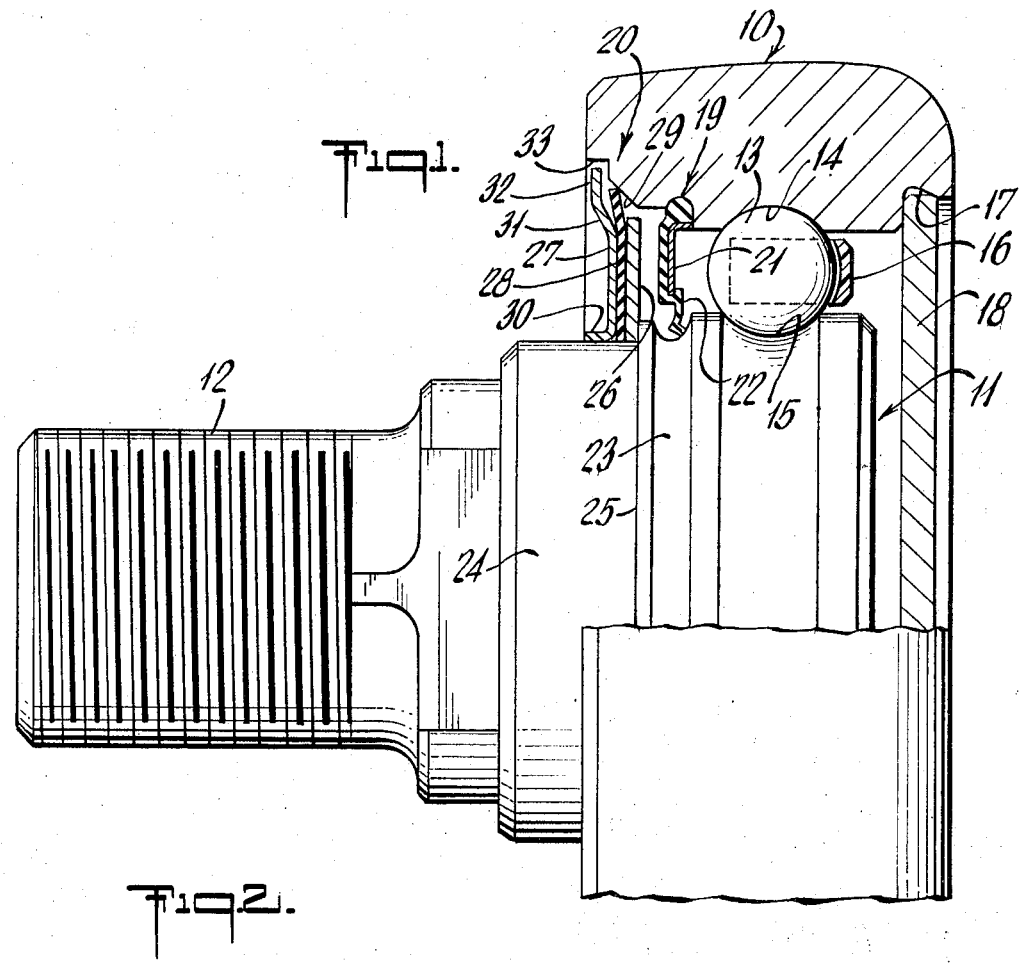
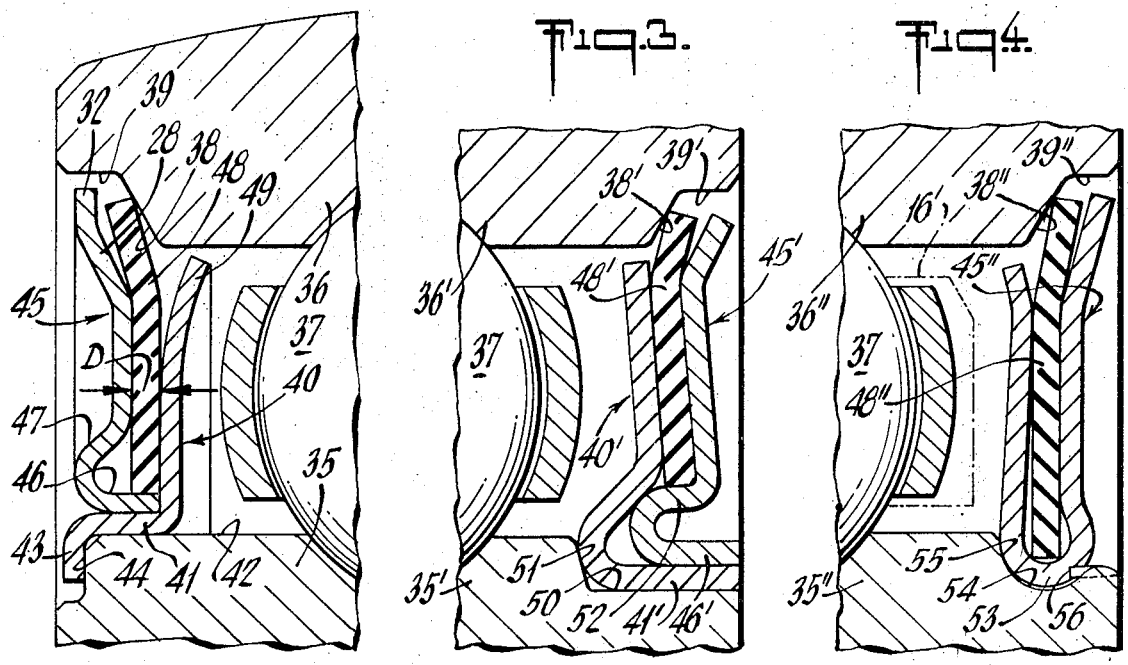

BEARING WITH COMBINED SLINGER-SEAL

The invention relates to seal structure in a bearing such as an antifriction bearing.

It is an object of the invention to provide improved structure of the character indicated.

Another object is to provide an improved seal with additional functions including a slinger function.

It is also an object to provide increased protection for a resilient seal element of such a structure, against dislocation as a result of externally applied forces, as from a high-pressure hose discharge.

A further object is to provide a basically simple structure which can readily be applied to a more conventionally sealed bearing to provide an extended labyrinth and additional seal and slinger functions.

Also, it is an object to provide a seal structure meeting the above objects and inherently resistive to lubricant loss.

Another object is to provide a seal structure which inherently forecloses the penetration of incipient fibre wrappage, as may develop at the region of the inner ring outer diameter.

A still further object is to provide a slinger-contact seal which inherently prevents a pressure build-up of dirt and contamination between slinger and contact seal members.

Other objects and various further features of novelty and invention will be pointed out or will occur to those skilled in the art from a reading of the following specification, in conjunction with the accompanying drawing. In said drawing, which shows, for illustrative purposes only, preferred forms of the invention:

FIG. 1 is a view in elevation of a roller and stud assembly in which seal structure of the invention has been embodied, roller and seal parts being broken-away to reveal a longitudinal section thereof; and FIGS. 2 to 4 are enlarged fragmentary sectional views to show modified seal structures.

In FIG. 1, the invention is shown in application to a roller ring 10 which is also the outer race element of an antifriction bearing. The inner race element 11 of the bearing is a stud, having a reduced threaded end 12 for mounting purposes. Plural antifriction elements or balls 13 ride opposed raceways 14–15 in the bearing elements 10–11, and are held in angularly spaced relation by suitable retainer means 16. One axial end of the bore of the outer ring 10 is counterbored with an undercut at 17, offset axially beyond the corresponding end of the inner member or stud 11, to define a shoulder to which a closure plate 18 may be fitted and permanently retained. The other axial end of the bearing is sealed, at a first stage 19 of conventional construction and at a second stage 20 of the invention.

At the first stage 19, the seal member comprises a flanged annular reinforcement plate 21 to which resilient elastomeric material such as Buna N has been molded and bonded. An outer bead of this material is backed by the flange of plate 21, for firm resilient support and location in a circumferentially continuous groove which locally characterizes the bore of the outer bearing ring or roller 10. A circumferentially continuous resilient seal lip 22 projects radially inward of plate 21 and is in axially inwardly loaded wiping contact with the inner flared surface of a groove 23 in the land adjacent the inner raceway 15. Just beyond this groove 23, the body of inner element 11 is reduced to define a cylindrical land 24 and shoulder 25, which accommodate the mounting of the second stage 20.

Briefly, the stage 20 of the invention comprises spaced inner and outer annular plate elements 26–27, fixedly carried by the inner bearing element, in axially located relation with shoulder 25 and providing sandwich support of a resilient seal disc 28. Both plate elements 26–27 extend into relatively close clearance relation with the outer ring 10, and their outer limits diverge axially with respect to the outer portion or lip of the seal disc; such clearances preferably are less than or at least no greater than the thickness of the seal disc 28. The axial divergence of these outer plate portions preferably substantially spans the effective axial extent of an outwardly flaring surface 29 against which the lip of disc 28 is resiliently loaded, for a constant wiping seal contact. As shown, the outer plate element 27 has an integral inner sleeve portion 30 by which it is mounted with a press-fit to land 24, to retain an axially compressed assembled relation of the sandwich 26-28-27 against shoulder 25. Plate 27 is also shown with an outwardly flaring frustoconical portion 31, which enables the outer skirt 32 of plate 27 to axially clear the lip of seal 28 and the seal surface 29; an axially shallow counterbore 33 between the seal surface 29 and the axial end of ring 10 enables (a) recessed mounting of plate 27 within the volumetric envelope of the outer ring 10 and (b) definition of a labyrinthian passage at close radial and axial clearances between skirt 32 and the adjacent surfaces of the counterbore 33.

It is noted that the axially outer plate 27 serves the combined functions of a slinger and of an extended protector of the flexible lip of the seal disc 28, particularly when it extends to a radius at least as great as (and, preferably greater than) the outer radius of the seal lip, as shown. It is further noted that the conical flare 31 of plate 27 achieves (in conjunction with the axially inner plate 26) a net divergence from supppot of disc 31, at a location removed from the bore of outer ring 10, thus providing a substantial range of radii over which the lip portion of disc 28 may axially flex, for the described wiping-seal contact. Still further it is noted that, although flat, plate 26 is axially positioned at substantially the axially inner end of the seal surface 29 and is thus at least no further axially outward than this limit of the seal surface; this relation assures a wide latitude for seal adaptation to surface 29 and that such inward driving pressures as may inwardly displace the seal lip will not be able to force the same beyond plate 26.

In the arrangement of FIG. 2, a modified slinger-seal combination is applied to an antifriction bearing comprising inner and outer race rings 35–36 spaced by balls 37 riding the ring raceways. The axial end of the bore of the outer ring 36 is counterbored to define an outwardly flared seal surface 38 adjacent a cylindrical, inwardly offsetting wall 39. The axially inner plate 40 includes a cylindrical sleeve portion 41 in force-fitted assembly to the land 42 of the inner ring 35; an integral inward flange 43 locates against a recessed shoulder 44, to enable all parts to fit within the included volume of the outer ring 36. The outer or slinger plate 45 has the conical and skirt formations 28–32 already described, and at its bore is integrally formed with a sleeve portion 46 as the tangential extension of a reverse bend and bead 47, whereby a degree of stiffly compliant yielding can assure a secure coaxially piloted mount on the sleeve portion 41; sleeve portion 46 extends as an axially inward offset beyond the primary axially inner radial surface of plate 45, to enable abutting location against plate 40, for a separation D which assures firm radial support for the resilient seal disc 48. This offset will also be seen to enable inspection of a correct initial mounting of plate 40 to inner ring 35, whereupon, with disc 48 piloted on offset 46, a preassembly of parts can be driven to final assembly over the already mounted sleeve portion 41.

As with the FIG. 1 arrangement, the radially outer edges of plates 40–45 diverge, from a radial location well removed from the bore of outer ring 36, thus establishing a substantial radial range for flexure of seal disc 48. As shown, the radially outer part 49 of plate 40 is flared axially inwardly, to relatively close radial clearance with the adjacent land of ring 36, thus guiding the toroidal return flow of bearing lubricant in the direction axially inwardly, toward the outer raceway, for recycled use. Such promotion of return flow conserves lubricant, prolongs bearing life through better lubrication, and is inherently resistive to pumping or expulsion of lubricant; plate 40 may therefore be called anti-purging.

Many of the parts of FIGS. 3 and 4 correspond to those identified in FIG. 2 and are therefore given the same reference numbers, primed in certain cases to avoid confusion.

In FIG. 3, the seal disc 48' is sandwiched between two plate members 40'–45' which are slightly conically dished to achieve greater seal lip deflection at contact with the seal surface 38' in the outer ring 36. An integral mounting sleeve portion 41' of plate member 40' is force-fitted to a land 50 and against a shoulder 51 in the inner ring 35'. The outer plate member 45' is similarly formed with a mounting sleeve portion 46', for which the reverse bend includes an axial offset 52 by which preassembly of disc 48' can coaxially pilot on member 45'. The bead which connects this offset 52 to sleeve portion 46' is the means of axially abutting contact with plate member 40'. Again, the radially outer limits of members 40'–45' diverge to allow ample radial range for flexed displacement of the seal lip, and the radial clearances to outer ring 36' are relatively close. Also, the dished orientation of the inner plate member 40' is such as to promote the return flow of lubricant, as noted for FIG. 2.

In FIG. 4, the inner and outer plate members or elements 40''–45'' are integral walls of a single formed-metal part, having a U-shaped section, wherein the rounded bead 53 which connects these walls is the means of fixed assembly to a suitable mounting groove 54 and shoulder 55 at the axial end of inner ring 35''. The resilient seal disc 48'' is coaxially positioned within the U-shaped section and is clamped between the radially outward walls 40''–45''. Clearances and the diverging relationship of walls 40''–45'', with respect to outer ring 36'' and with respect to the flexed seal lip, are as previously described. If desired, staking or local inner-ring roughening (suggested at 56) may assure against rotational or other loosening of the assembled seal structure.

It will be seen that the described structures efficiently and economically meet all stated objects. The described structure not only provides both slinger and seal functions, but is additionally characterized by (a) labyrinthian features, (b) inherent protection against outward exposure of the seal lip, (c) reduced purging tendency, (d) inherent resistance to seal-lip collapse, even under strong impinging iquid-jet action, (e) inherent resistance to loss of lubricant, and (f) combination with existing-type seals, as in FIG. 1, to establish a double seal. The form of FIG. 4 represents an almost irreducible minimum in overall axial length requirements, allowing maximum clearance with an adjacent unusually bulky ball retainer, suggested by phantom outline 16'. Additionally, the described constructions present substantially no cavity or space between slinger and contact-seal elements. Thus, inherently foreclosing penetration of foreign matter, fibre wrappage, dirt and the like which can otherwise develop undue pressure on the seal are between the moving parts; the bearing configurations of the invention are thus inherently resistive to dirt being forced into the bearing. Thus, while the elastomeric and the metal parts of the slinger-seals of the invention have been described as separate parts, it will be understood that, for example, the seal member 28 of FIG. 1 may be bonded to the plate 26 or to the plate 27, or both, thus simplifying assembly operations.

While the invention has been described in detail for the preferred forms shown, it will be understood that modifications may be made without departure from the invention.

What is claimed is:

1. In a bearing, inner and outer relatively rotatable race elements having radially spaced and opposed raceways and antifriction elements spacing said race elements and riding said raceways, and seal structure carried by the radially inner one of said race elements on one axial side of said antifriction elements, said seal structure comprising a flexible annular seal disc and first and second annular plate elements retained in axially abutting support relation with corresponding radial regions of said seal disc, said regions being radially intermediate said race elements, said plate elements being separate parts of formed sheet metal secured to said inner race element at a predetermined axial offset from said antifriction elements, said axially inner part including an integral axial sleeve portion riding said inner race element, and said axially outer part including an integral axial sleeve portion riding the sleeve portion of said axially inner part, the outer race element including an outwardly flaring surface partly overlapped by said seal disc in resilient axially inwardly loaded peripheral contact therewith, the respective radially outer limits of said plate elements being in clearance relation with said outer race element, and the radially outer portion of the axially outer plate element radially overlapping and axially clearing said seal disc.

2. The bearing of claim 1, in which said inner race element includes shoulder means in axially positioning abutment with said axially inner part.

3. The bearing of claim 1, in which the sleeve portion of said axially outer part includes an axially inwardly directed offset, said seal disc being radially supported on said offset.

4. The bearing of claim 3, in which said offset has axially limiting abutment with said axially inner part.

5. The bearing of claim 1, in which said plate elements axially diverge from contact with said seal member in the region of seal-disc flexure and contact with the outwardly flaring surface of said outer race element.

6. The bearing of claim 1, in which the axially inner plate element extends into relatively close radial clearance with said outer race element and at an axial location that is at least no further axially outward than the axial location of the inner end of said flaring surface.

7. The bearing of claim 6, in which said clearance is at least no greater than substantially the thickness of said seal disc.

8. The bearing of claim 1, in which the axial clearance between said seal disc and the radially outer portion of the axially outer plate element is less than the effective thickness of said disc.

9. The bearing of claim 1, in which said flexible annular seal disc is bonded to at least one of said first and second annular plate elements.

10. In a bearing, inner and outer relatively rotatable race elements having radially spaced and opposed raceways and antifriction elements spacing said race elements and riding said raceways, first seal structure carried by the radially inner one of said race elements on one axial side of said antifriction elements, and second seal structure carried by said outer race element within the axial space between said antifriction elements and said first seal structure; said first seal structure comprising a flexible annular seal disc and first and second annular plate elements retained in axially abutting support relation with corresponding radial regions of said seal disc, said regions being radially intermediate said race elements, said plate elements being secured to said inner race element at a predetermined axial offset from said antifriction elements, the outer race element including an outwardly flaring surface partly overlapped by said seal disc in resilient axially inwardly loaded peripheral contact therewith, the respective radially outer limits of said plate elements being in clearance relation with said outer race element, and the radially outer portion of the axially outer plate element radially overlapping and axially clearing said seal disc; and said second seal structure including a flexible seal disc in resiliently loaded circumferentially continuous wiping contact with said inner race element.

11. The bearing of claim 10, in which the flexible annular seal disc of said first seal structure is bonded to at least one of said first and second annular plate elements.

12. The bearing of claim 10, in which the peripheral surface of said inner race element is flared at wiping contact with said second flexible seal disc, the direction of resiliently loaded contact being axially inward.

13. A sealed antifriction bearing comprising inner and outer rings with radially opposed raceways and antifriction elements riding said raceways and spacing said rings, the bore of said outer ring having a circumferentially continuous outwardly flared seal surface near one axial end, the outer surface of the inner ring including a radial shoulder near said one end, and seal structure secured to said inner ring and located by said shoulder, said structure including an anti-purge plate carried by said inner ring and located by said shoulder and extending into relatively close clearance with said outer ring at a location at least no further axially outward than the axially inner limit of said flared seal surface, a flexible annular seal disc supported on its axially inner side by said plate, and a slinger plate fixed with respect to said anti-purge plate and in axially compressed supporting relation with the axially outer side of said seal disc, the portion of said disc thus supported being radially inward of any part of the bore of said outer ring, and the axial location of such support being axially inwardly offset from the region of seal contact with said flared surface, whereby the seal contact is characterized by axially inwardly directed loading, and the radially outer part of said slinger radially overlapping said seal disc and extending into relatively close clearance relation with said outer ring, said anti-purge plate including an integral mounting sleeve portion riding a circumferentially continuous part of said inner ring, and said slinger plate including an integral mounting sleeve portion riding the sleeve portion of said anti-purge plate.

14. The bearing of claim 13, in which the sleeve portion of said slinger plate is axially inwardly directed and is in axially limited abutment with said anti-purge plate.

* * * * *